(12) United States Patent
Watanabe et al.

(10) Patent No.: US 7,935,947 B2
(45) Date of Patent: May 3, 2011

(54) GLASS COMPOSITION FOR ULTRAVIOLET LIGHT AND OPTICAL DEVICE USING THE SAME

(75) Inventors: Tomohiro Watanabe, Yokohama (JP); Taihei Mukaide, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 231 days.

(21) Appl. No.: 12/515,857

(22) PCT Filed: Nov. 5, 2008

(86) PCT No.: PCT/JP2008/070543
§ 371 (c)(1),
(2), (4) Date: May 21, 2009

(87) PCT Pub. No.: WO2009/060984
PCT Pub. Date: May 14, 2009

(65) Prior Publication Data
US 2010/0072406 A1   Mar. 25, 2010

(30) Foreign Application Priority Data
Nov. 9, 2007   (JP) .................................. 2007-292527

(51) Int. Cl.
*C03C 1/00*   (2006.01)
*C01F 17/00*   (2006.01)
(52) U.S. Cl. .................... 250/504 R; 250/397; 250/398; 252/301.2 F; 252/301.2 P; 362/83; 362/84; 313/484; 313/486; 313/487
(58) Field of Classification Search ............. 250/504 R, 250/397, 398; 252/301.2 F, 301.2 P; 362/83, 362/84; 313/484, 486, 487
See application file for complete search history.

(56) References Cited

U.S. PATENT DOCUMENTS

| | | | | |
|---|---|---|---|---|
| 3,915,757 A | * | 10/1975 | Engel | 148/278 |
| 5,350,927 A | * | 9/1994 | Rakhimov et al. | 250/504 R |
| 5,472,720 A | * | 12/1995 | Rakhimov et al. | 426/241 |
| 5,552,602 A | * | 9/1996 | Kakibayashi et al. | 250/311 |
| 5,717,207 A | * | 2/1998 | Koguchi et al. | 250/311 |
| 7,132,060 B2 | * | 11/2006 | Zagumennyi et al. | 252/301.4 F |
| 7,578,880 B2 | * | 8/2009 | Sato et al. | 106/493 |
| 7,591,962 B2 | * | 9/2009 | Justel et al. | 252/301.4 P |
| 7,750,311 B2 | * | 7/2010 | Daghighian | 250/398 |
| 7,808,170 B2 | * | 10/2010 | Justel et al. | 313/486 |
| 2006/0086311 A1 | * | 4/2006 | Zagumennyi et al. | 117/13 |
| 2008/0259602 A1 | | 10/2008 | Fechner et al. | |

(Continued)

FOREIGN PATENT DOCUMENTS

JP   2007-290899   11/2007

(Continued)

OTHER PUBLICATIONS

International Search Report and Written Opinion in PCT/JP2008/070543.

(Continued)

*Primary Examiner* — David A Vanore
(74) *Attorney, Agent, or Firm* — Fitzpatrick, Cella, Harper & Scinto

(57) ABSTRACT

A glass composition for ultraviolet light is provided. The glass composition for ultraviolet light contains Lu, Si, and O in an amount of 99.99 weight % or more in total. The glass composition contains Lu in an amount of 26% or more and 39% or less in cation percent and Si in an amount of 61% or more and 74% or less in cation percent.

3 Claims, 2 Drawing Sheets

U.S. PATENT DOCUMENTS

| | | | |
|---|---|---|---|
| 2009/0168398 A1* | 7/2009 | Collier | 362/84 |
| 2010/0084962 A1* | 4/2010 | Winkler et al. | 313/484 |
| 2010/0102250 A1* | 4/2010 | Li et al. | 250/459.1 |
| 2010/0142181 A1* | 6/2010 | Schmidt et al. | 362/84 |

FOREIGN PATENT DOCUMENTS

| | | |
|---|---|---|
| JP | 2008-147167 | 6/2008 |
| WO | WO 2006/006640 A1 | 1/2006 |

OTHER PUBLICATIONS

John H. Burnett et al., "High-Index Materials for 193 nm Immersion Lithography" *Proceedings of SPIE*, vol. 5754 (2005), pp. 611-621.

J. Arndt et al., "Anomalous Changes in Some Properties of Silica Glass Densified at Very High Pressures" *Physics and Chemistry of Glasses*, vol. 10 No. 3, Jun. 1969, pp. 117-124.

\* cited by examiner

GLASS COMPOSITION FOR ULTRAVIOLET LIGHT AND OPTICAL DEVICE USING THE SAME

TECHNICAL FIELD

The present invention relates to a glass composition for ultraviolet light and an optical device using the composition, particularly an oxide glass composition suitable for an optical member used in the optical device and the optical device using the composition.

BACKGROUND ART

An optical member is utilized in a wide range of fields such as a camera and a telescope. The optical member can be roughly classified into two types using a crystal as a starting material and glass as the starting material. A crystalline optical member of these optical members is divided in use depending on a crystal system. An optical member used as a lens in an imaging optical system is formed of a cubic crystal. By using an optically isotropic cubic crystal, it is possible to reduce birefringence or the like due to optical anisotropy.

With high integration of a semiconductor integrated circuit, demands on ultrafine pattern formation have increasingly grown. A reduced projection exposure device (stepper) of a step-and-repeat type for transferring a minute pattern onto a wafer grows more sophisticated, so that a wavelength of a light source for exposure is shifted to a short wavelength. An optical member which receives attention in optical members for that purpose is a cubic calcium fluoride single crystal having a high transmittance in an ultraviolet region. Further, in recent years, development of optical members using Lu, Al, Mg, and the like higher in refractivity than Si has been tried in order to realize a high refractive index of an optical member for the purpose of providing a higher resolution. For example, development of cubic crystals such as lutetium aluminum garnet single crystal ($Lu_3Al_5O_{12}$), magnesium oxide single crystal (MgO), and magnesium spinel single crystal ($MgAl_2O_4$) have been actively carried out. Particularly, the lutetium aluminum garnet single crystal has a high refractive index, thus being expected for future development. For example, the lutetium aluminum garnet single crystal has a refractive index of 2.1 at a wavelength of 193 nm. Quartz glass has a refractive index of 1.56 at the wavelength of 193 nm and the calcium fluoride single crystal has a refractive index of 1.50 at the wavelength of 193 nm.

In the single crystal materials, there arises a problem of an occurrence of intrinsic birefringence (IBR). MgO and $Al_2O_4$ have IBR values of 70 nm/cm (extrapolated value) and 52 nm/cm (extrapolated value), which are considerably larger than that (3.4 nm/cm) of $CaF_2$ (John H. Burnett, Simon G, Kaplan, Eric L. Shirley, Paul J. Tompkins, and James E. Webb, "High-Index Materials for 193 nm Immersion Lithography, Preprint—Proceedings of SPIE Vol. 5754—Optical Microlithography XVIII (2005)).

For this reason, development of a material causing no IBR is required. As an example of development of a high-refractive index optical member having a high transmittance in the ultraviolet region, an attempt is made to increase the refractive index by realizing permanent high density of quartz glass under application of a pressure (Phys. Chem. Glasses 10, 117 (1969)). However, a change in refractive index by the pressure application is small, so that the above described high-refractive index optical member has not been put into practical use.

In summary, it is difficult to increase the refractive index of the quartz glass, and the crystalline optical member such as the lutetium aluminum garnet single crystal causes the IBR. Further, when the above described optical members are used in an immersion exposure device as an optical device, the optical members have not been sufficient in terms of various characteristics.

DISCLOSURE OF THE INVENTION

The present invention has been accomplished in view of the above-described circumstances. A principal object of the present invention is to provide a glass composition for ultraviolet light less causing a problem of an occurrence of intrinsic birefringence (IBR).

Another object of the present invention is to provide a glass composition for ultraviolet light having a high refractive index and a high transmittance and causing less or no IBR and less or no stress birefringence (SBR).

A further object of the present invention is to provide a glass composition for ultraviolet light having a resistance to light of a light source and a resistance to a liquid used.

A still further object of the present invention is to provide optical devices using the above-described glass composition for ultraviolet lights.

According to an aspect of the present invention, there is provided a glass composition for ultraviolet light, comprising:

Lu, Si, and O in an amount of 99.99 weight % or more in total, wherein the glass composition contains Lu in an amount of 26% or more and 39% or less in cation percent and Si in an amount of 61% or more and 74% or less in cation percent.

According to another aspect of the present invention, there is provided an optical device comprising:

a light source for generating ultraviolet light; and an optical system for irradiating an object with the ultraviolet light from the light source, wherein the optical system includes an optical member comprising a base material and/or an optical thin film, and wherein the base material and/or the optical thin film comprises a glass composition for ultraviolet light, comprising:

Lu, Si, and O in an amount of 99.99 weight % or more in total, wherein the glass composition contains Lu in an amount of 26% or more and 39% or less in cation percent and Si in an amount of 61% or more and 74% or less in cation percent.

According to a further aspect of the present invention, there is provided an optical device comprising:

a light source for generating ultraviolet light; and an optical system for irradiating an object with the ultraviolet light from the light source, wherein the optical system includes a first optical member and a second optical member having a refractive index larger than that of the first optical member, and wherein the second optical member comprises a base material comprising a glass composition for ultraviolet light, comprising:

Lu, Si, and O in an amount of 99.99 weight % or more in total, wherein the glass composition contains Lu in an amount of 26% or more and 39% or less in cation percent and Si in an amount of 61% or more and 74% or less in cation percent.

As a result of study on glass materials free from IBR, the present inventors have found that a composition of Lu, Si, and O is not crystallized but is vitrified (changed into an amorphous substance) when the composition of Lu, Si, and O is in a particular range as described above. An oxide of Lu itself is little vitrified but has a higher refractive index (1.933 at a wavelength of 587.6 nm) compared with a refractive index (1.458 at a wavelength of 587.6 nm) of an oxide of Si. The composition of an Lu oxide and an Si oxide in the particular range was synthesized and was found that the composition was vitrified to constitute a glass composition having a high refractive index.

According to the present invention, with respect to ultraviolet lights having wavelengths of 365 nm, 248 nm, 193 nm, and 157 nm, it is possible to provide a glass composition having solved the above described problem of the occurrence of the IBR (intrinsic birefringence).

Further, according to the present invention, it is possible to provide a glass composition for ultraviolet light having a low SBR (stress birefringence) and resistances to ultraviolet light and a liquid used and provide an optical device using the glass composition for ultraviolet light.

These and other objects, features and advantages of the present invention will become more apparent upon a consideration of the following description of the preferred embodiments of the present invention taken in conjunction with the accompanying drawings.

BEST MODE FOR CARRYING OUT THE INVENTION

Figure 1:
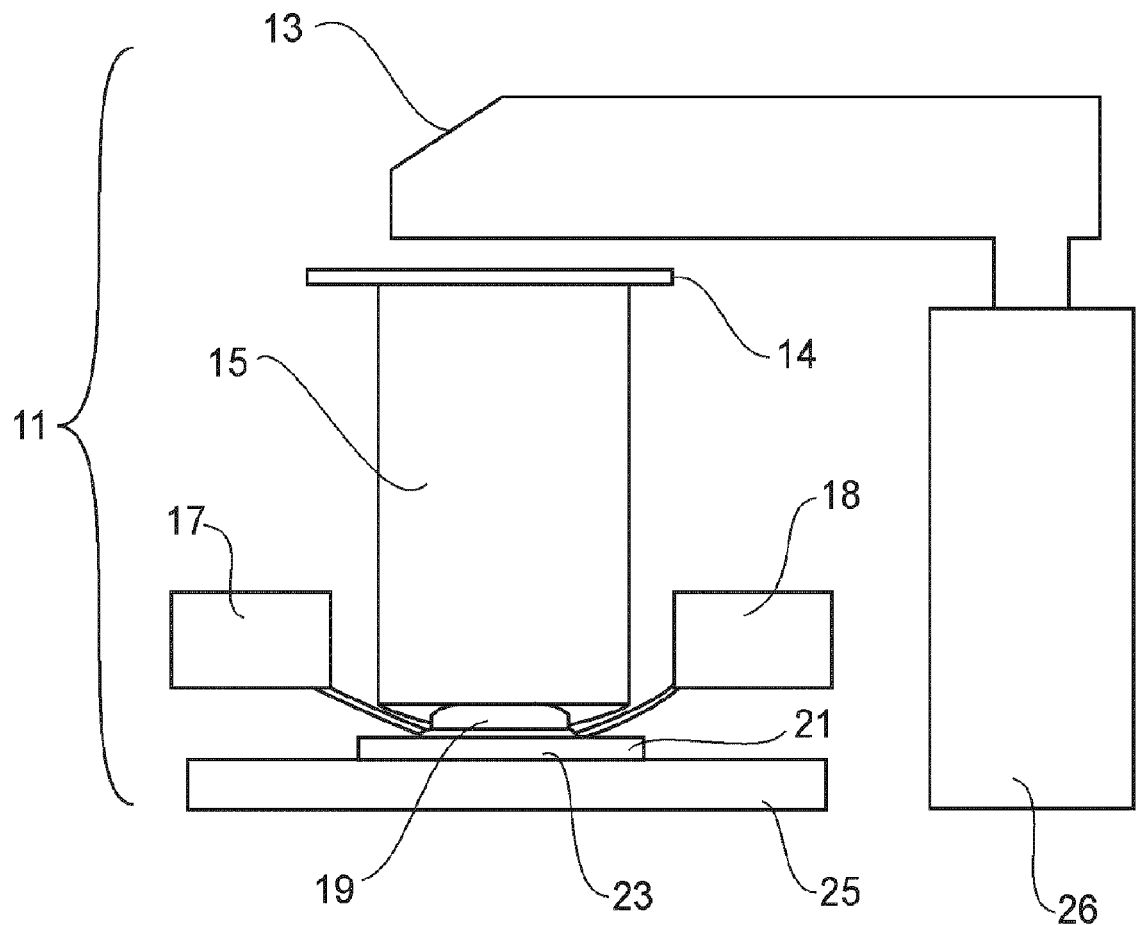
FIG. 1 is a schematic view showing an optical device according to an embodiment of the present invention.

Embodiments for carrying out the present invention are shown below. However, it should be understood that the following description does not limit the scope of the present invention unless otherwise specified.

Embodiment 1

A glass composition according to Embodiment 1 of the present invention contains Lu, Si, and O in an amount of 99.99 weight (wt.) % in total and contains Lu in an amount of 26% or more and 39% or less in cation percent and Si in an amount of 61% or more and 74% or less in cation percent.

In an oxide glass composition, when a main component of the glass is consisting of Lu, Si, and O, a vidifiable range is determined by contents thereof. Vadification is performed by a method in which melt of a target composition is prepared and abruptly cooled or by a vapor phase synthesizing method such as chemical vapor deposition (CVD) or the like.

The glass composition of this embodiment contains Lu, Si, and O in the total amount of 99.99 wt. %, preferably in a total amount unlimitedly closer to 100 wt. %. As described above, this glass composition contains Lu in the amount of 26% or more and 39% or less, preferably 27% or more and 37% or less, in cation percent and Si in the amount of 61% or more and 74% or less, preferably 63% or more and 73% or less, in cation percent. When the contents of Lu and Si are within these ranges, the composition is changed into an amorphous substance, thus being preferable since the problem of the intrinsic birefringence (IBR) does not arise.

Herein, the cation percent of Lu means a ratio of the ion number of a cation of Lu to the sum of the ion number of cations of Lu and Si. The cation percent of Si means a ratio of the ion number of the cation of Lu to the sum of the ion number of the cations of Lu and Si.

The glass composition of Lu, Si, and O described above may preferably be consisting of $Lu_2O_3$ and $SiO_2$. In this case, the contents of $Lu_2O_3$ and $SiO_2$ may preferably be represented by Lu in the amount of 26% or more and 39% or less in cation percent and Si in the amount of 61% or more and 74% or less in cation percent.

In the glass composition, an impurity impairs vitrification and generates a defective portion in many cases, so that the content thereof may appropriately be controlled in an amount of 100 ppm or less. On the other hand, boron (B) may be added to the glass composition as desired.

The above-described glass composition itself can be utilized as not only a base material (glass material) of a lens but also a sputtering target to be used for forming an optical thin film.

These lens and optical thin film may suitably be used as an optical member through which ultraviolet light with a wavelength of 365 nm or less, preferably 248 nm or less, further preferably 193 nm or less, passes.

Embodiment 2

In an exposure device as an optical device according to Embodiment 2 of the present invention, a light source for generating light in a vacuum ultraviolet region with a wavelength of 200 nm or less (e.g., ArF excimer laser; oscillation wavelength=193 nm and $F_2$ excimer laser; oscillation wavelength=157 nm) is used. This is because a resolution line width is smaller with a smaller exposure wavelength and a larger numerical aperture, thus improving a resolution.

In this embodiment, a liquid such as pure water is filled between an exposure substrate and a final lens of the exposure device to substantially decrease a wavelength of light at the surface of the exposure substrate, thus constituting an immersion exposure device for improving a resolution.

The immersion exposure device at least includes the light source, an illumination optical system, an optical mask (reticle), a projection optical system, and a supply/recovery device for the liquid. Exposure to light is performed in a state in which the liquid is filled between a lens (final lens) provided at an end of the projection optical system close to the exposure substrate and the exposure substrate provided with a photosensitive film.

The final lens of such an immersion exposure device is required to have a high refractive index and a high transmittance at a wavelength of light from the light source. Further, the final lens is also required to cause less or no birefringence (IBR and SBR). In addition, the final lens is required to have resistances to the light from the light source and the liquid used. For these increases, in Embodiment 2, the lens comprising the glass composition described in Embodiment 1 is used as the final lens. As lenses other than the final lens, lenses of quartz glass are used.

On these lenses, an optical thin film for preventing reflection is formed as desired.

FIG. 1 is a schematic view of the immersion exposure device.

Referring to FIG. 1, an immersion exposure device 11 includes an illumination optical system 13, an optical mask (reticle) 14, a projection optical system 15 separated from the illumination optical system 13 by the mask 14, liquid supply/recovery devices 17 and 18, a stage 25 capable of moving an exposure substrate, and a laser light source 26.

The projection optical system 15 includes lenses formed of quartz glass as a first optical member having a relatively low refractive index and a final lens 19 as a second optical member having a relatively high refractive index. The projection optical system 15 effects exposure by irradiating an exposure substrate 21 provided with a photosensitive film as an objected (to be exposed) with ultraviolet light in a state in which a liquid 23 is filled between the final lens 19 and the exposure substrate 21 provided with the photosensitive film.

By this exposure, a pattern of the optical mask (reticle) 14 is reduced in size and can be transferred onto the exposure substrate 21. In FIG. 4, the liquid 23 is held only between the final lens 19 and the exposure substrate 21 but is not limited thereto. For example, the entire substrate 21 may also be immersed in the liquid 23. As the liquid 23, it is possible to use pure water having a refractive index (at 20° C.) of 1.44 with respect to a wavelength of 193 nm and a fluorine-containing organic solvent.

The immersion exposure device of Embodiment 2 may preferably include a laser light source with a wavelength of 200 nm as the light source. More specifically, the immersion exposure device includes an ArF excimer laser oscillator or an $F_2$ excimer laser oscillator. By using such a laser light source with a short wavelength as the light source, a resolution of the resultant exposure device can be improved.

The optical member according to this embodiment is suitably used as an optical member for an exposure device transparent to vacuum ultraviolet light with a wavelength of 193 nm or 157 nm.

Embodiment 3

An optical device according to Embodiment 3 of the present invention includes a light source for generating ultraviolet light and an optical system for irradiating an object with the ultraviolet light from the light source. The optical system includes an optical member comprising a base material and/or an optical thin film. The base material and/or the optical thin film comprises a glass composition for ultraviolet light, comprising: Lu, Si, and O in an amount of 99.99 weight % or more in total, wherein the glass composition contains Lu in an amount of 26% or more and 39% or less in cation percent and Si in an amount of 61% or more and 74% or less in cation percent.

In other words, a lens is prepared by using the above-described glass composition for ultraviolet light itself as the base material.

Alternatively, an optical member lens such as a lens or a mirror is prepared by forming an optical thin film with a high refractive index on a surface of the base material such as a silicon wafer or quartz glass through sputtering using the above-described glass composition for ultraviolet light as a target. The optical thin film is characterized by containing Lu, Si, and O in an amount of 99.99 weight % or more in total and containing Lu in an amount of 26% or more and 39% or less in cation percent and Si in an amount of 61% or more and 74% or less in cation percent.

The optical member according to this embodiment is suitably used as an optical member for an optical device transparent to ultraviolet light with a wavelength of 365 nm or less, preferably 248 nm or less, further preferably 193 nm or less.

The present invention is described more specifically based on Examples below.

Example 1

As starting materials for synthesizing glass, $Lu_2O_3$ (purity: 99.99 wt. %) and $SiO_2$ (purity: 99.995 wt. %) were used. These starting materials were weighed so that $Lu_2O_3$ and $SiO_2$ contain Lu in an amount of 30% in cation percent and Si in an amount of 70% in cation percent, respectively. A stoichiometric mixture ratio between $Lu_2O_3$ and $SiO_2$ is $Lu_2O_3$:$SiO_2$=2.84:1 in terms of a weight ratio but $SiO_2$ sublimates during fusion to decrease. For this reason, a proportion of $SiO_2$ contained in the starting materials was appropriately adjusted. These starting materials were sufficiently mixed in a mortar. Thereafter, about 100 mg of the mixture was partly melted by irradiation with a carbon dioxide gas laser and an output of the laser was lowered, so that a spherical polycrystalline aggregate was prepared.

Figure 2:
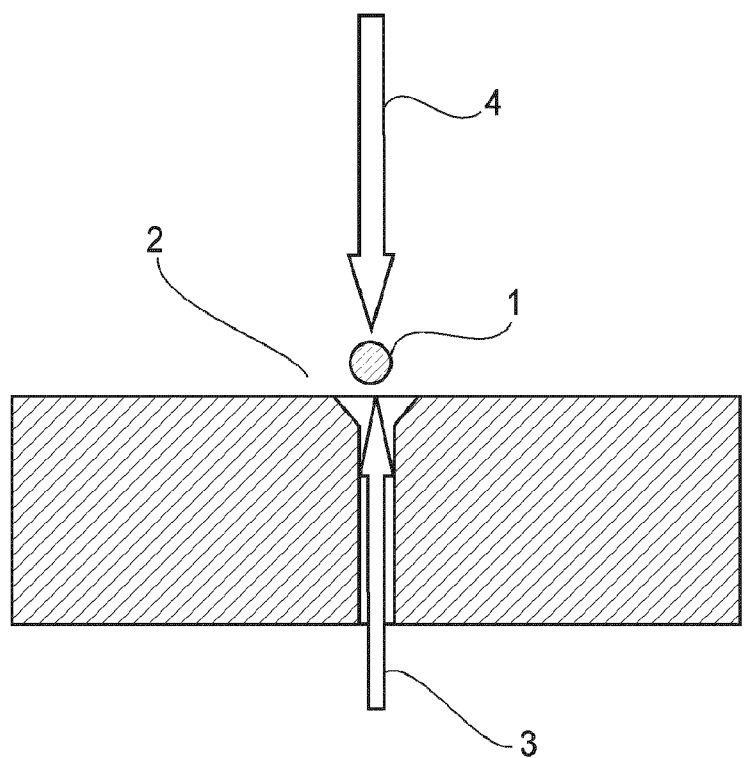
FIG. 2 is a schematic view showing a gas jet leviatino device.

This polycrystalline aggregate as a sample 1 was set on a copper nozzle 2 of the gas jet levitation device shown in FIG. 2 and was then heated again by the carbon dioxide gas laser 4 in a floating state created by using dry air 3, thus being completely melted. In that state, the output of the laser was cut off to abruptly cool the sample 1, so that a transparent spherical material was obtained. This process was monitored by a radiation pyrometer with respect to a temperature but an exothermic reaction due to crystallization was not observed.

Figure 3:
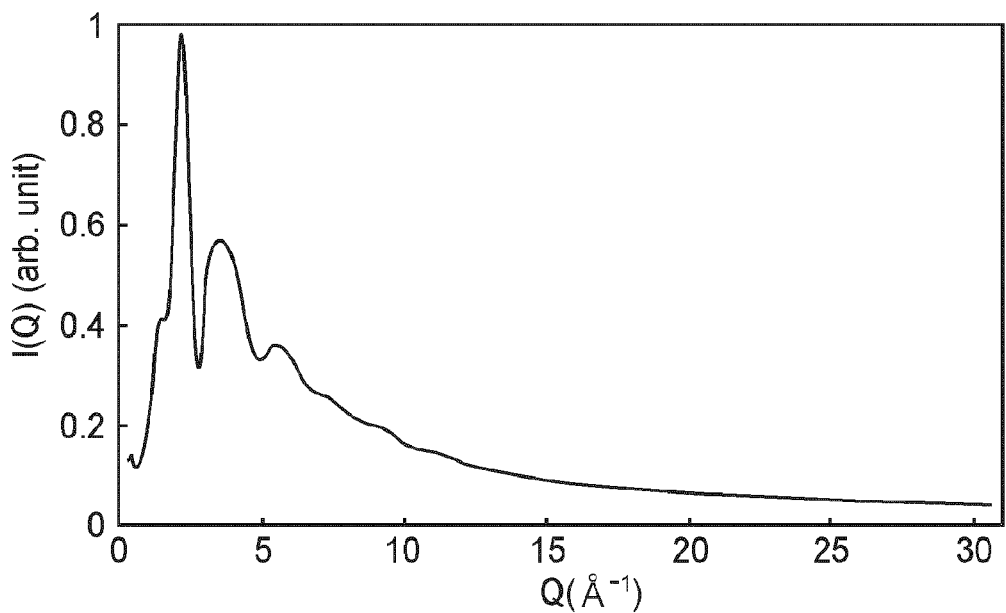
FIG. 3 is a graph showing an X-ray scattering pattern of glass obtained in Example 1 of the present invention.

This transparent spherical material was examined with respect to the presence or absence of a crystal by an X-ray diffraction method, FIG. 3 shows an X-ray scattering intensity curve of the transparent spherical material. In FIG. 3, an abscissa represents Q (=4 $\pi$ sin $\theta$/$\lambda$) and an ordinate represents a scattering intensity I(Q). As a light source, an X-ray monochromatized to 113.4 KeV was used. Three or four spherical samples (diameter: 2-3 mm) were placed in a capillary of $SiO_2$ glass or interposed between kapton films and scattering X-ray from the samples was measured by a Ge solid detector. From the scattering pattern shown in FIG. 3, a diffraction pattern showing crystallinity was not found and the scattering pattern was a halo pattern characterizing glass, so that it was confirmed that the transparent spherical material in this example was a glass (amorphous material).

Example 2

As starting materials for synthesizing glass, $Lu_2O_3$ (purity: 99.99 wt. %) and $SiO_2$ (purity: 99.995 wt. %) were used. These starting materials were weighed so that $Lu_2O_3$ and $SiO_2$ contain Lu in an amount of 26% in cation percent and Si in an amount of 74% in cation percent, respectively. A stoichiometric mixture ratio between $Lu_2O_3$ and $SiO_2$ is $Lu_2O_3$:$SiO_2$=2.33:1 in terms of a weight ratio but $SiO_2$ sublimates during fusion to decrease. For this reason, a proportion of $SiO_2$ contained in the starting materials was appropriately adjusted. These starting materials were sufficiently mixed in a mortar. Thereafter, about 100 mg of the mixture was partly melted by irradiation with a carbon dioxide gas laser and an output of the laser was lowered, so that a spherical polycrystalline aggregate was prepared.

This polycrystalline aggregate as a sample 1 was set on a nozzle 2 of the gas jet levitation device shown in FIG. 2 and was then heated again by the carbon dioxide gas laser 4 in a floating state created by using dry air 3, thus being completely melted. In that state, the output of the laser was cut off to abruptly cool the sample, so that it was possible to obtain a spherical glass.

Example 3

As starting materials for synthesizing glass, $Lu_2O_3$ (purity: 99.99 wt. %) and $SiO_2$ (purity: 99.995 wt. %) were used. These starting materials were weighed so that $Lu_2O_3$ and $SiO_2$ contain Lu in an amount of 34% in cation percent and Si in an amount of 66% in cation percent, respectively. A stoichiometric mixture ratio between $Lu_2O_3$ and $SiO_2$ is $Lu_2O_3$:$SiO_2$=3.41:1 in terms of a weight ratio but $SiO_2$ sublimates during fusion to decrease. For this reason, a proportion of $SiO_2$ contained in the starting materials was appropriately adjusted. These starting materials were sufficiently mixed in a mortar. Thereafter, about 100 mg of the mixture was partly melted by irradiation with a carbon dioxide gas laser and an output of the laser was lowered, so that a spherical polycrystalline aggregate was prepared.

This polycrystalline aggregate as a sample 1 was set on a nozzle 2 of the gas jet levitation device shown in FIG. 2 and was then heated again by the carbon dioxide gas laser 4 in a floating state created by using dry air 3, thus being completely melted. In that state, the output of the laser was cut off to abruptly cool the sample, so that it was possible to obtain a spherical glass.

Example 4

As starting materials for synthesizing glass, $Lu_2O_3$ (purity: 99.99 wt. %) and $SiO_2$ (purity: 99.995 wt. %) were used. These starting materials were weighed so that $Lu_2O_3$ and $SiO_2$ contain Lu in an amount of 39% in cation percent and Si in an amount of 61% in cation percent, respectively. A stoichiometric mixture ratio between $Lu_2O_3$ and $SiO_2$ is $Lu_2O_3$:$SiO_2$=4.23:1 in terms of a weight ratio but $SiO_2$ sublimates during fusion to decrease. For this reason, a proportion of $SiO_2$ contained in the starting materials was appropriately adjusted. These starting materials were sufficiently mixed in a mortar. Thereafter, about 100 mg of the mixture was partly melted by irradiation with a carbon dioxide gas laser and an output of the laser was lowered, so that a spherical polycrystalline aggregate was prepared.

This polycrystalline aggregate as a sample 1 was set on a copper nozzle 2 of the gas jet levitation device shown in FIG. 2 and was then heated again by the carbon dioxide gas laser 4 in a floating state created by using dry air 3, thus being completely melted. In that state, the output of the laser was cut off to abruptly cool the sample, so that it was possible to obtain a spherical material.

Comparative Example 1

As starting materials for synthesizing glass, $Lu_2O_3$ (purity: 99.99 wt. %) and $SiO_2$ (purity: 99.995 wt. %) were used. These starting materials were weighed so that $Lu_2O_3$ and $SiO_2O$ contain Lu in an amount of 25% in cation percent and Si in an amount of 75% in cation percent, respectively. A stoichiometric mixture ratio between $Lu_2O_3$ and $SiO_2$ is $Lu_2O_3$:$SiO_2$=2.21:1 in terms of a weight ratio but $SiO_2$ sublimates during fusion to decrease. For this reason, a proportion of $SiO_2$ contained in the starting materials was appropriately adjusted. These starting materials were sufficiently mixed in a mortar. Thereafter, about 100 mg of the mixture was partly melted by irradiation with a carbon dioxide gas laser and an output of the laser was lowered, so that a spherical polycrystalline aggregate was prepared.

This polycrystalline aggregate as a sample 1 was set on a copper nozzle 2 of the gas jet levitation device shown in FIG. 2 and was then heated again by the carbon dioxide gas laser 4 in a floating state created by using dry air 3, thus being completely melted. In that state, the output of the laser was cut off to abruptly cool the sample, so that it was found that the resultant sample became white and turbid, thus being in a polycrystalline state.

Comparative Example 2

As starting materials for synthesizing glass, $Lu_2O_3$ (purity: 99.99 wt. %) and $SiO_2$ (purity: 99.995 wt. %) were used. These starting materials were weighed so that $Lu_2O_3$ and $SiO_2$ contain Lu in an amount of 41% in cation percent and Si in an amount of 59% in cation percent, respectively. A stoichiometric mixture ratio between $Lu_2O_3$ and $SiO_2$ is $Lu_2O_3$:$SiO_2$=4.60:1 in terms of a weight ratio but $SiO_2$ sublimates during fusion to decrease. For this reason, a proportion of $SiO_2$ contained in the starting materials was appropriately adjusted. These starting materials were sufficiently mixed in a mortar. Thereafter, about 100 mg of the mixture was partly melted by irradiation with a carbon dioxide gas laser and an output of the laser was lowered, so that a spherical polycrystalline aggregate was prepared.

This polycrystalline aggregate as a sample 1 was set on a copper nozzle 2 of the gas jet levitation device shown in FIG. 2 and was then heated again by the carbon dioxide gas laser 4 in a floating state created by using dry air 3, thus being completely melted. In that state, the output of the laser was cut off to abruptly cool the sample, so that it was found that the resultant sample became white and turbid, thus being in a polycrystalline state.

Results of Examples 1 to 4 and Comparative Examples 1 and 2 described above are shown in Table 1.

TABLE 1

| Ex. No. | Lu (%)[*1] | Si (%)[*2] | Vitrification |
| --- | --- | --- | --- |
| Comp. Ex. 1 | 25 | 75 | Not vitrified |
| Ex. 2 | 26 | 74 | Vitrified |
| Ex. 1 | 30 | 70 | Vitrified |
| Ex. 3 | 34 | 66 | Vitrified |
| Ex. 4 | 39 | 61 | Vitrified |
| Comp. Ex. 2 | 41 | 59 | Not Vitrified |

[*1]Cation percent of Lu for $Lu_2O_3$
[*2]Cation percent of Si for $SiO_2$

INDUSTRIAL APPLICABILITY

The glass composition for ultraviolet light according to the present invention is capable of suppressing an adverse influence due to intrinsic birefringence (IBR), so that the glass composition can be utilized as not only a lens for visible light but also a lens for ultraviolet light.

While the invention has been described with reference to the structures disclosed herein, it is not confined to the details set forth and this application is intended to cover such modifications or changes as may come within the purpose of the improvements or the scope of the following claims.

The invention claimed is:
1. An optical device comprising:
a light source for generating ultraviolet light; and
an optical system for irradiating an object with the ultraviolet light from said light source,
wherein said optical system includes a first optical member and a second optical member having a refractive index larger than that of the first optical member, and
wherein the second optical member comprises a base material comprising a glass composition for ultraviolet light, comprising:
Lu, Si, and O in an amount of 99.99 weight % or more in total, wherein said glass composition contains Lu in an amount of 26% or more and 39% or less in cation percent and Si in an amount of 61% or more and 74% or less in cation percent.

2. An optical device comprising:

a light source for generating ultraviolet light; and an optical system for irradiating an object with the ultraviolet light from said light source, wherein said optical system includes an optical member comprising a base material and/or an optical thin film, and wherein the base material and/or the optical thin film comprises a glass composition for ultraviolet light, comprising:

Lu, Si, and O in an amount of 99.99 weight % or more in total, wherein said glass composition contains Lu in an amount of 26% or more and 39% or less in cation percent and Si in an amount of 61% or more and 74% or less in cation percent.

3. A glass composition for ultraviolet light, comprising:

Lu, Si, and O in an amount of 99.99 weight % or more in total, wherein said glass composition contains Lu in an amount of 26% or more and 39% or less in cation percent and Si in an amount of 61% or more and 74% or less in cation percent.

* * * * *